Figures 1, 2:
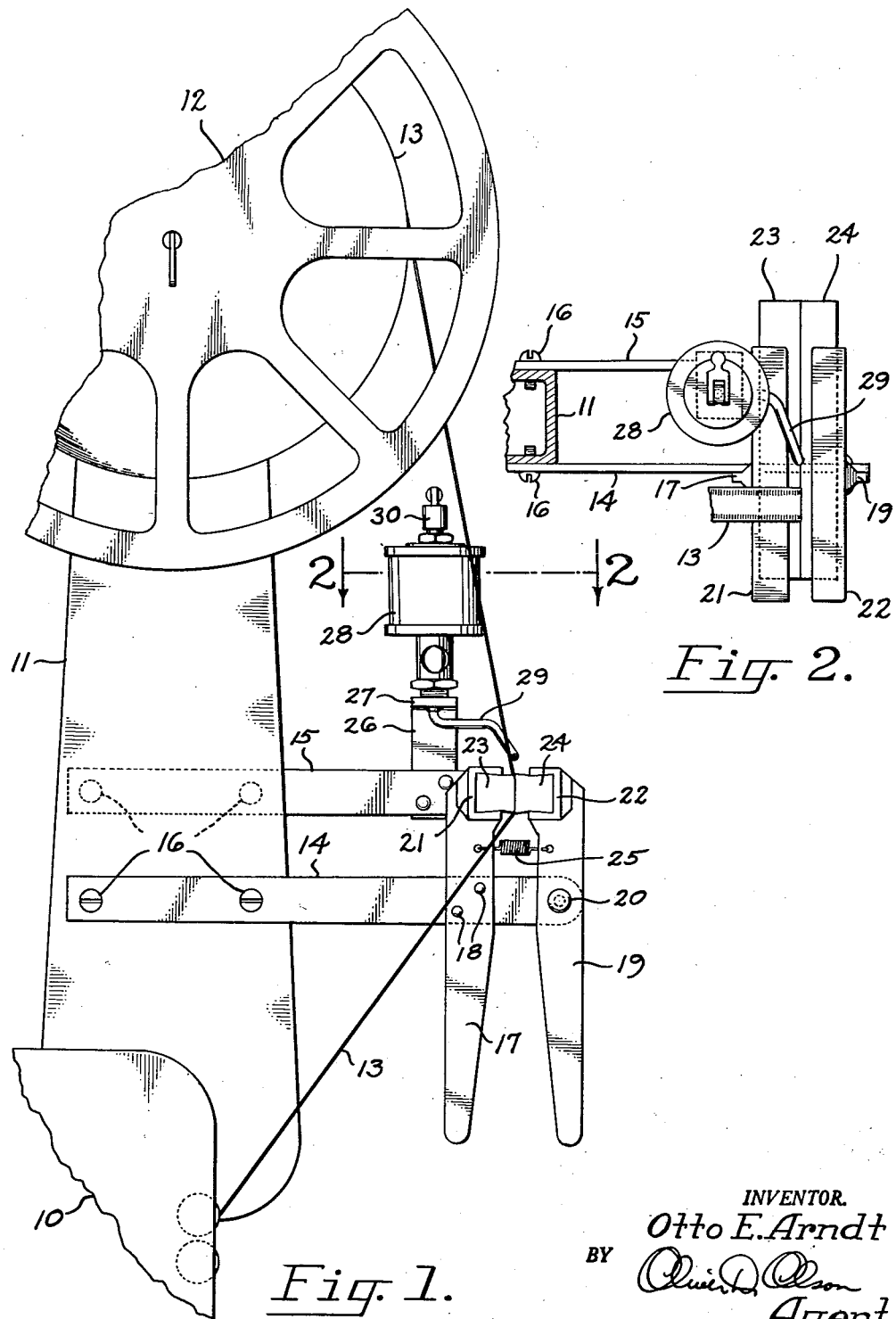

June 25, 1957 — O. E. ARNDT — 2,796,618
FILM CLEANING DEVICE
Filed Feb. 4, 1955

INVENTOR.
Otto E. Arndt
BY
Agent

United States Patent Office 2,796,618
Patented June 25, 1957

2,796,618

FILM CLEANING DEVICE

Otto E. Arndt, Garden Home, Oreg.

Application February 4, 1955, Serial No. 486,213

5 Claims. (Cl. 15—100)

This invention pertains to motion picture projectors and relates particularly to a simplified device for cleaning the film as it passes through the projector.

In the use of motion picture projectors, it is desirable that the film be cleaned in order to preserve its life and to project the pictures with maximum detail and resolution. This is particularly important in the use of film for television broadcast, to insure the highest quality of picture reception.

The devices of the prior art have not been completely satisfactory, primarily for two reasons: First, the devices are very complex in structure and are therefore too costly for general usage, and require considerable maintenance, adjustment and repair. Secondly, the prior art devices are limited to use with only certain types of projecting apparatus and therefore are not adaptable to all types of projectors without considerable and costly revision.

Accordingly, it is a principal object of the present invention to provide a film cleaning device which is of simplified construction for economical manufacture, which involves a minimum of moving parts, whereby to reduce the time and expense of maintenance and repair to a minimum, and which is adaptable for use with projectors of all types.

Another important object of this invention is to provide a film cleaning device which is easy to operate and is adjustable to afford a large number of cleaning surfaces.

Other objects and advantages of the present invention will appear from the following detailed description taken in connection with the acompanying drawings, in which:

Figure 1 is a fragmentary view in side elevation of a motion picture projector, having mounted thereon a film cleaning device embodying the features of the present invention; and Figure 2 is a fragmentary sectional view taken along the line 2—2 in Figure 1.

In Figure 1 of the drawing, there is shown in fragmentary view a motion picture projector including the housing 10, which contains the projecting apparatus, and a pedestal 11 extending upwardly from the housing 10 and supporting at its upper end a reel 12 on which is wound the film 13 which is fed to the projector mechanism in housing 10.

Interposed between the housing 10 and reel 12 is the film cleaning device of the present invention. This device includes a pair of elongated bracket members 14, 15 which are secured to opposite sides of the pedestal 11, as by means of the screws 16. The brackets extend forwardly of the pedestal toward the path of the film 13.

Secured firmly to bracket member 14 intermediate the ends of the latter and extending transversely thereof in a vertical plane is arm 17. This arm may be cast as an integral part of bracket 14, or as illustrated in the drawing, it may be attached to the bracket by such means as the rivets 18. A second lever arm 19 is pivotally secured on the forward end of bracket member 14 by means of pivot pin 20, whereby to pivot the arm 19 in a plane parallel to the plane of arm 17.

To the upper ends of the arms 17, 19 there are attached the elongated holders 21, 22, respectively, which extend parallel to each other and transversely of the said arms. Each of these holders is substantially U-shaped in cross section, with their spaced edges facing each other.

Each of the holders 21, 22 receives slidably therein an elongated stick of absorbent material 23, 24, respectively. In the preferred embodiment illustrated, the absorbent sticks are of square cross section and are proportioned to extend forwardly of the spaced edges of the holders. In order that the holders may secure the sticks therein and yet permit their longitudinal movement, the spaced edges of each holder are proportioned to converge toward each other. Thus, the absorbent sticks are compressed slightly in the area of the forward edges of the holders, as shown in Figure 1.

The lever arm 19 and its attached holder 22 is normally urged into counterclockwise rotation (Figure 1) about pivot 20 by means of spring 25, which is connected between the arms 17 and 19. Thus, the absorbent stick 24 is normally held in face-contacting relation with stick 23.

In some instances it may be desirable to operate the device with the sticks 23, 24 dry, although it is preferred to moisten the sticks with conventional film cleaning liquid. Although this may be done by hand, by periodically moistening the sticks from a separate container, it is preferred that it be done automatically. To this end there is mounted upon bracket member 15 and extending upwardly therefrom a bracket 26, the upper end 27 of which is offset to provide a base upon which to support the reservoir 28. A tube 29 extends through the offset base 27 and communicates at one end with the reservoir 28 through an adjustable needle valve which is adjusted by knob 30, in manner well-known in the art. The opposite end of tube 29 terminates adjacent the longitudinal center of the holders 21, 22, preferably at a point above the holders and in the plane of the abutting surfaces of the absorbent sticks, as shown in the drawing.

In the operation of the device described hereinbefore, the reservoir 28 is filled with any conventional type of liquid film cleaner, many types of which are well-known to those skilled in the art. These liquid cleaners may also afford lubrication, as well as anti-static properties, and these also are well-known in the art. The needle valve adjustment 30 is set to provide sufficient liquid to the absorbent sticks 23, 24, by means of tube 29, so as to afford effective cleaning of the film.

The handle end of the arms 17 and 19 are grasped in the hand, whereupon lever arm 19 is pivoted clockwise about pivot 20, against the tension of spring 25, and the absorbent stick 24 carried in holder 22 is moved away from stick 23. The film 13 is then drawn forwardly and inserted between the sticks 23 and 24. Lever arm 19 is then released and stick 24 is moved, by means of the spring 25, into engagement with the film and stick 23.

The motion picture projector is then put in operation, whereupon the film 13 is drawn from reel 12 downwardly between the absorbent sticks 23, 24 where it is cleaned by the liquid absorbed in said sticks and then fed to the projector mechanism in housing 10.

It is to be noted that, when the area of the absorbent sticks 23, 24 in contact with the film 13 becomes soiled during cleaning of the film, the sticks may be pushed by hand longitudinally of the holders 21, 22 in either direction from the soiled area, to present a fresh, clean surface to the film. In addition, when the entire areas of the abutting surfaces of the sticks are soiled, the sticks may be removed and rotated 90° and replaced within the holders, whereby to present clean surfaces to the film. This process may be repeated until all four sides of each of the absorbent sticks have been used, after which they are either cleaned or discarded and replaced by new sticks.

From the foregoing, it is apparent that the present invention provides simple and economical means for thoroughly cleaning motion picture film while in use in a projector. The device is readily adapted to any type of projector and its simplified construction affords an ease of operation and maintenance heretofore not available in the devices of the prior art. The absorbent cleaning sticks are adjustable both longitudinally and axially, whereby to present a large number of fresh surfaces to the film for cleaning purposes, thereby rendering the device economical in use.

It will be apparent to those skilled in the art that various changes may be made in the construction details described hereinbefore without departing from the scope and spirit of the present invention. Accordingly, it is to be understood that the foregoing description is primarily illustrative of the invention and is not to be construed as limiting the scope thereof.

Having now described my invention and the manner in which the same may be used, what I claim as new and desire to secure by Letters Patent is:

1. A film cleaning device for motion picture projectors, comprising a support adapted to be mounted on a projector and extending toward the path of the film, a pair of elongated holder members mounted transversely on the support for relative displacement with respect to each other, resilient means normally urging said members toward each other, the holder members being substantially U-shaped in cross section with the spaced longitudinal edges thereof facing each other and extending in the transverse direction of the film, and a pair of elongated absorbent stick members supported by the holder members for adjustable movement longitudinally of the latter and transversely of the film, the abutting surfaces of the stick members extending beyond the facing edges of the holders and adapted to receive flatwise and transversely therebetween the film to be cleaned, the length of the stick members being substantially greater than the width of the film, whereby to provide a plurality of longitudinally spaced cleaning sections presentable to the film by said longitudinal adjustment of the stick members.

2. The device of claim 1 wherein the spaced edges of each of the U-shaped holder members converge toward each other whereby to compress the stick members transversely and to retain the stick members frictionally therein against lateral displacement.

3. The device of claim 1 wherein the stick members are of substantially square cross section, whereby selectively to present a plurality of cleaning surfaces to the film to be cleaned.

4. The device of claim 1 including liquid cleaner supply means mounted on the support and communicating with the absorbent stick members adjacent the film for supplying liquid cleaner to the stick members in proximity to the film.

5. A film cleaning device for motion picture projectors, comprising a support adapted to be mounted on a projector and extending toward the path of the film, a pair of elongated holder members on the support, pivot means mounting at least one of the holder members on the support for relative displacement with respect to the other holder member, the holder members being mounted transversely of the support, resilient means normally urging said members toward each other, the holder members being substantially U-shaped in cross section with the spaced longitudinal edges thereof facing each other and extending in the transverse direction of the film, and a pair of elongated absorbent stick members of substantially square cross section supported by the holder members for adjustable movement longitudinally of the latter and transversely of the film, the abutting surfaces of the stick members extending beyond the facing edges of the holders and adapted to receive flatwise and transversely therebetween the film to be cleaned, the length of the stick members being substantially greater than the width of the film whereby to provide a plurality of longitudinally spaced cleaning sections presentable to the film by said longitudinal adjustment of the stick members.

References Cited in the file of this patent

UNITED STATES PATENTS

| | | |
|---|---|---|
| 964,355 | Wilson | July 12, 1910 |
| 1,665,727 | Campbell | Apr. 10, 1928 |
| 2,117,828 | Soman | May 17, 1938 |
| 2,319,355 | Storey | May 18, 1943 |
| 2,408,438 | Mills | Oct. 1, 1946 |
| 2,580,814 | Morley | Jan. 1, 1952 |

FOREIGN PATENTS

| | | |
|---|---|---|
| 244,072 | Switzerland | Mar. 1, 1947 |